United States Patent
Gaide

(10) Patent No.: US 10,866,073 B2
(45) Date of Patent: Dec. 15, 2020

(54) METHOD FOR PRODUCING MULTI-COMPONENT CASES

(71) Applicant: Albert Gaide, Monnaz (CH)

(72) Inventor: Albert Gaide, Monnaz (CH)

(*) Notice: Subject to any disclaimer, the term of this patent is extended or adjusted under 35 U.S.C. 154(b) by 0 days.

(21) Appl. No.: 16/327,375

(22) PCT Filed: Aug. 23, 2017

(86) PCT No.: PCT/IB2017/055079
§ 371 (c)(1),
(2) Date: Feb. 22, 2019

(87) PCT Pub. No.: WO2018/037352
PCT Pub. Date: Mar. 1, 2018

(65) Prior Publication Data
US 2019/0178615 A1 Jun. 13, 2019

(30) Foreign Application Priority Data
Aug. 23, 2016 (CH) .................................. 01077/16

(51) Int. Cl.
*F42B 5/29* (2006.01)
*B21D 51/54* (2006.01)
*F42B 5/285* (2006.01)
*F42B 33/00* (2006.01)

(52) U.S. Cl.
CPC ............... *F42B 5/29* (2013.01); *B21D 51/54* (2013.01); *F42B 5/285* (2013.01); *F42B 33/001* (2013.01)

(58) Field of Classification Search
CPC .... F42B 5/29; F42B 5/285; F42B 5/28; F42B 5/26; F42B 33/00; F42B 33/001; B21K 21/04; B21D 51/54; B21D 5/10; B21D 5/12; B21C 37/08; B21C 37/0815
USPC ............................. 102/464, 468; 86/10, 19.5
See application file for complete search history.

(56) References Cited

U.S. PATENT DOCUMENTS

| | | | | |
|---|---|---|---|---|
| 2,009,685 A | * | 7/1935 | Caputo | B23K 11/062 219/61.5 |
| 2,079,102 A | * | 5/1937 | Oreste | B21D 51/54 86/19.5 |
| 2,397,206 A | * | 3/1946 | Jay | B21D 51/54 86/19.5 |

(Continued)

FOREIGN PATENT DOCUMENTS

| | | |
|---|---|---|
| EP | 2543954 | 1/2013 |
| EP | 2552619 | 2/2013 |

(Continued)

OTHER PUBLICATIONS

International Search Report issued by the International Searching Authority, dated Dec. 4, 2017, for International Patent Application No. PCT/IB2017/055079; 13 pages.

(Continued)

*Primary Examiner* — Jonathan C Weber
(74) *Attorney, Agent, or Firm* — Faegre Drinker Biddle & Reath LLP

(57) ABSTRACT

The invention relates to a method for producing cases, in which a case sleeve is formed from thin sheets, forming at least one element over an insert, a form or a cavity reproducing the conicity, the shoulder and the mouth that are characteristic of the case. The invention also relates to a product produced by the method, such as an ammunition case.

9 Claims, 5 Drawing Sheets

(56) References Cited

U.S. PATENT DOCUMENTS

| | | | | |
|---|---|---|---|---|
| 2,442,841 A | * | 6/1948 | Catlin | B21D 51/54 |
| | | | | 86/19.5 |
| 2,502,012 A | * | 3/1950 | Kinkead | B21C 37/08 |
| | | | | 228/5.1 |
| 2,647,981 A | * | 8/1953 | Wogerbauer | B21C 37/0803 |
| | | | | 219/59.1 |
| 2,755,839 A | * | 7/1956 | Garrock | B21D 41/04 |
| | | | | 72/306 |
| 2,950,376 A | * | 8/1960 | Wogerbauer | B21C 37/0803 |
| | | | | 219/67 |
| 3,132,234 A | * | 5/1964 | Wogerbauer | B23K 11/062 |
| | | | | 219/67 |
| 4,455,725 A | * | 6/1984 | van Baal | B21D 51/54 |
| | | | | 86/19.5 |
| 4,604,954 A | * | 8/1986 | Clarke | F42B 5/181 |
| | | | | 102/434 |
| 4,723,472 A | * | 2/1988 | Lee | F42B 33/10 |
| | | | | 86/23 |
| 5,419,258 A | * | 5/1995 | Peters | F42B 5/28 |
| | | | | 102/468 |
| 8,987,627 B2 | * | 3/2015 | Berube | B21C 37/08 |
| | | | | 219/59.1 |
| 2011/0308660 A1 | * | 12/2011 | Berube | B21B 1/38 |
| | | | | 138/171 |

FOREIGN PATENT DOCUMENTS

| | | |
|---|---|---|
| GB | 129207 | 7/1919 |
| GB | 552441 | 4/1943 |

OTHER PUBLICATIONS

English translation of Search Report issued by the International Searching Authority, dated Dec. 4, 2017, for International Patent Application No. PCT/IB2017/055079; 3 pages.

English translation of International Preliminary Report on Patentability under Chapter I, dated Mar. 7, 2019, for International Patent Application No. PCT/IB2017/055079; 9 pages.

* cited by examiner

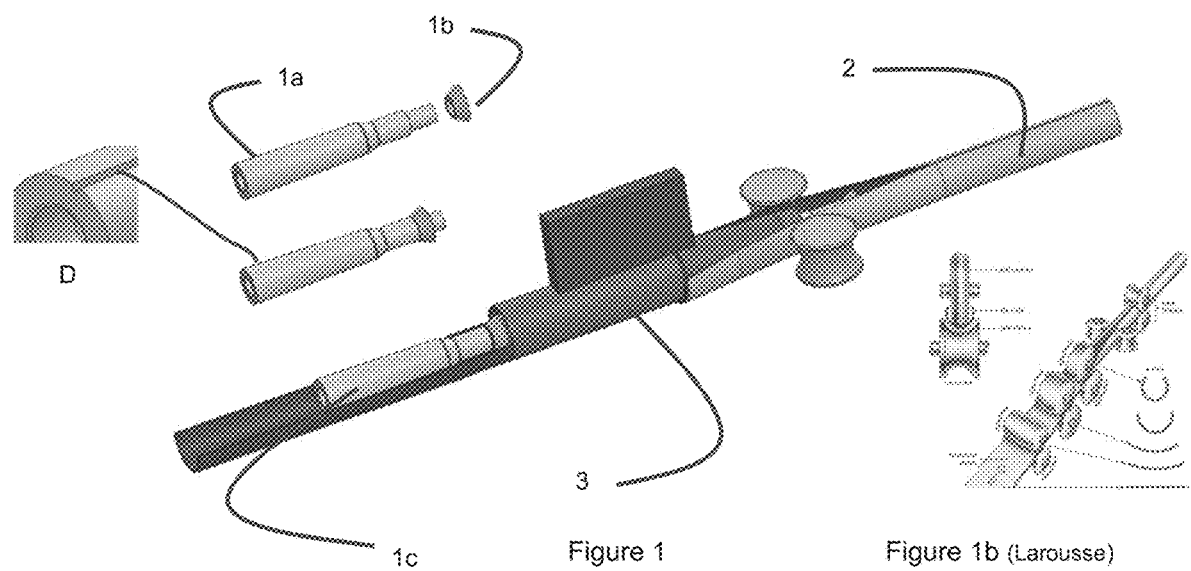
Figure 1  Figure 1b (Larousse)
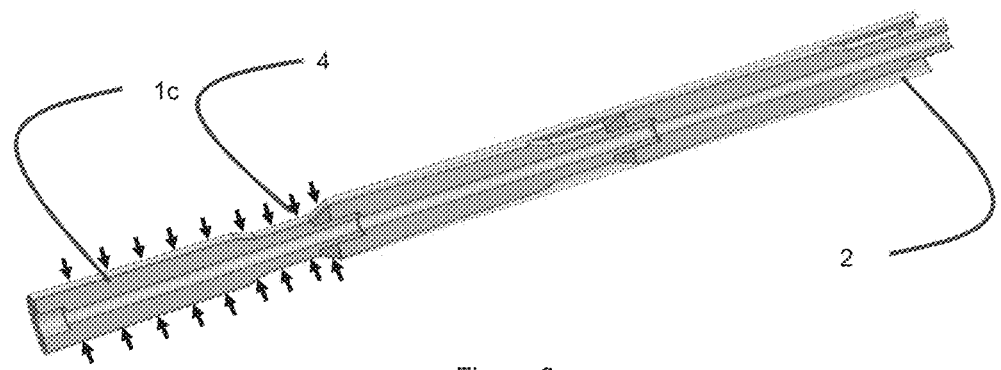
Figure 2
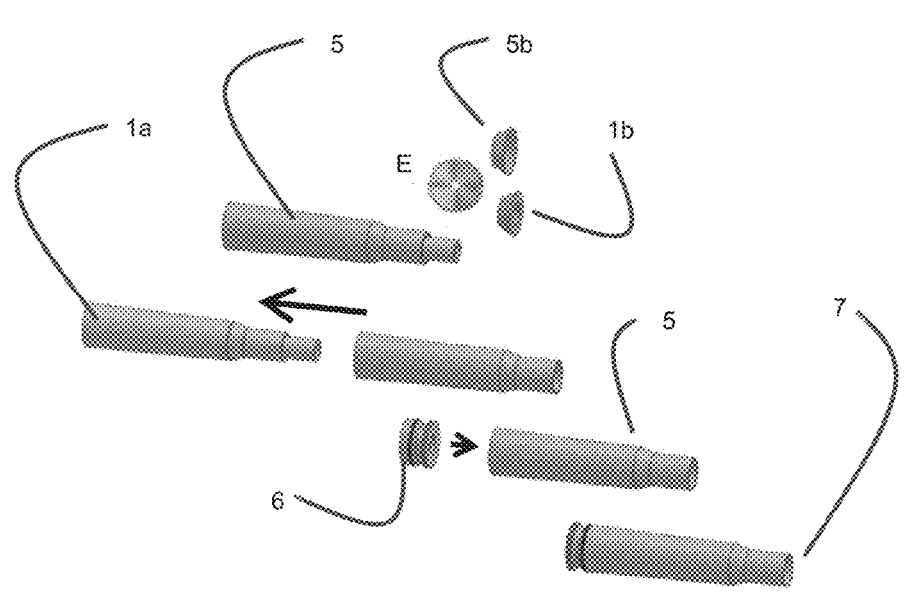
Figure 3

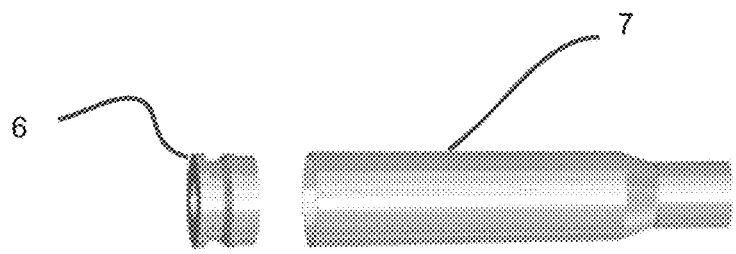
Figure 6
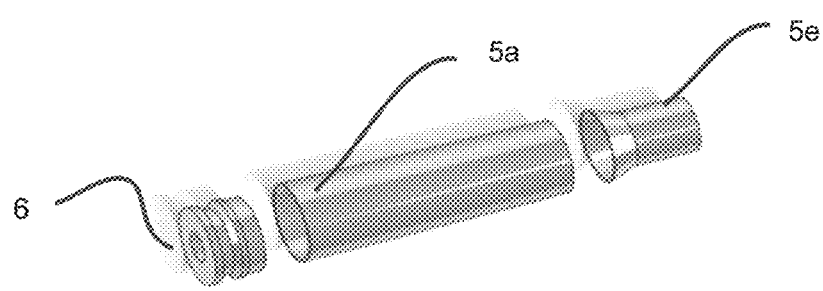
Figure 7
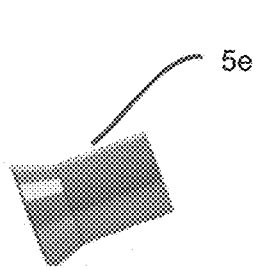
Figure 8
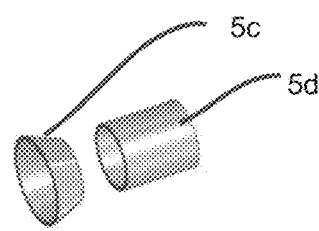
Figure 9a
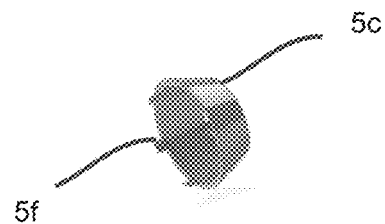
Figure 9b
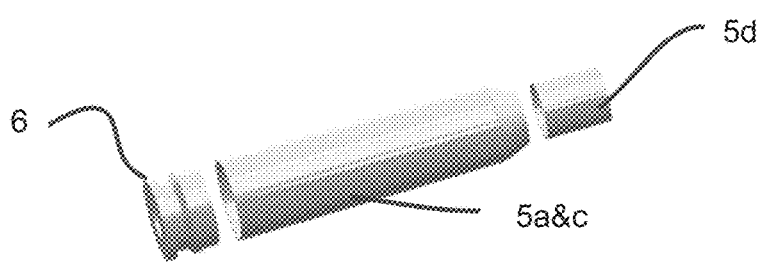
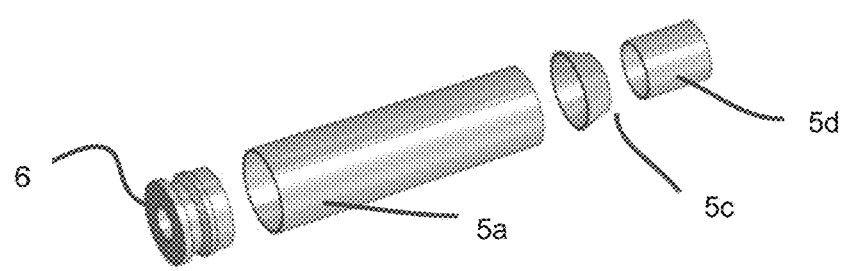
Figure 10

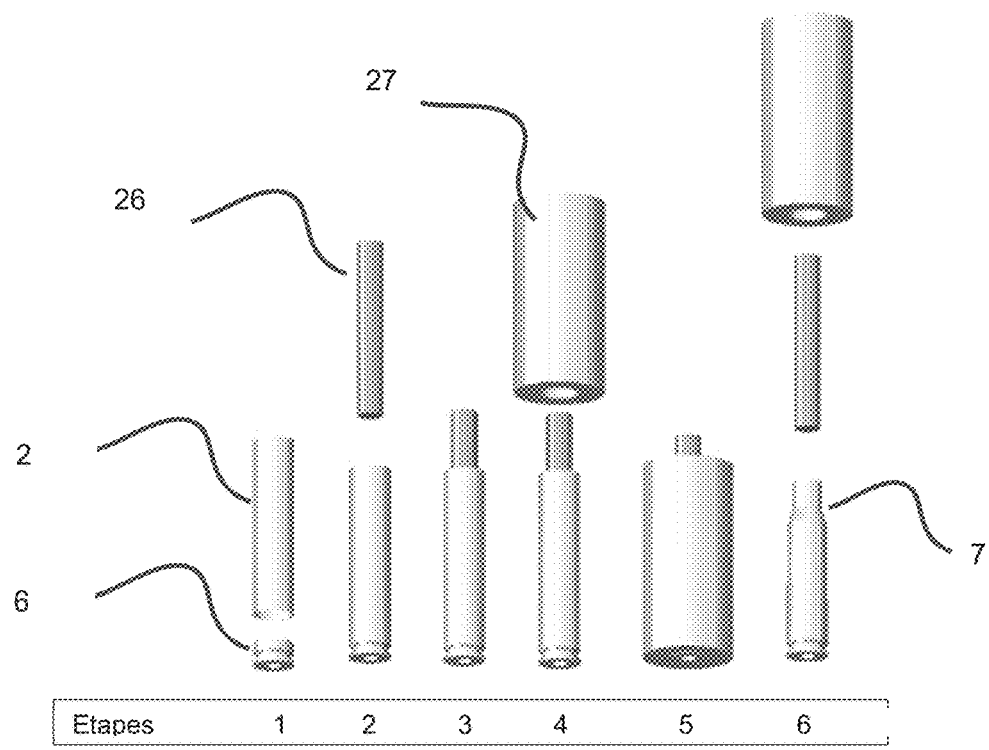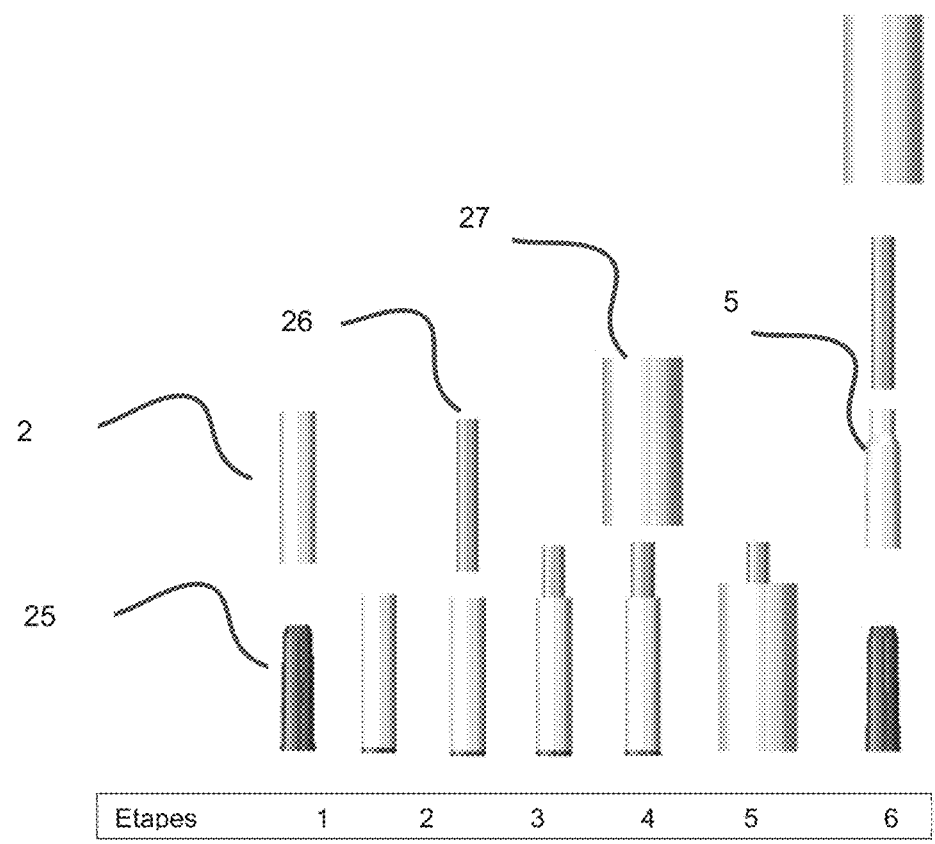
Figure 13

METHOD FOR PRODUCING MULTI-COMPONENT CASES

CROSS-REFERENCE TO RELATED APPLICATIONS

The present application is a national stage entry of International (PCT) Patent Application Number PCT/IB2017/055079, filed Aug. 23, 2017, which in turn claims priority to Swiss Patent Application No. 01077/16, filed Aug. 23, 2016, the subject matter of which are expressly incorporated herein by reference.

INTRODUCTION AND FIELD OF THE INVENTION

The manufacture of bullet ammunition cases, for example for firearms, is made, throughout the world and for more than a century, by the mechanical deformation of only one metal part made of brass, steel or other alloys.

The manufacturing methods related to this production mode include numerous stamping, drawing, hubbing and stretching operations, to mention only the main ones, which are interspersed with heat and/or chemical treatments intended to relax the tensions generated in the treated material and remove the oxidation produced in some cases by the heat treatment.

The significant manufacturing means that are necessary involve big presses, heat treatment facilities, chemical treatment facilities, machining machines, as well as transfer and supply systems.

These manufacturing methods have many disadvantages. The investments are significant, the chemical treatments require protection measurements against water pollution, the facilities are often designed for specific sizes. These manufacturing methods do not enable producing cases whose wall thickness is uniform as would be enabled by the manufacture of multi-component cases, for example illustrated in FIGS. 6 to 10, using thin strips, assembled by means of welding processes or mechanical processes which are well known and simpler to implement.

PRINCIPLE OF THE PRESENT INVENTION

An aim of the invention is to improve the methods for manufacturing bullet ammunition cases and produce lighter thin-walled cases offering more significant internal volume which allows increasing the amount and thus the extent of propellant.

More specifically, an aim of the present invention is therefore to propose simple, efficient and especially less expensive methods for manufacturing bullet ammunition cases made by assembling two or more elements produced in an optimized manner.

Another aim of the present invention is to simplify the handling of the used elements and to reduce the handling of unit elements, as is needed in the common facilities for supplying the presses and other machining stations.

Another aim of the present invention is to significantly reduce the necessary investments for the manufacture of bullet ammunition cases while keeping high production rates.

According to one embodiment, the invention relates to a method for manufacturing bullet ammunition cases, said case comprising at least one main portion called body but which will also be called taper-shaped "liner", a shoulder, a mouthpiece and a cap, method in which the liner and/or the shoulder and/or the mouthpiece is/are formed from at least one thin strip by shaping said strip(s) on a die (also called insert) reproducing at least the taper and/or the shoulder and/or the mouth characteristic of the case.

In one embodiment, the liner, the shoulder and the mouth are formed from the same strip or same part.

In one embodiment, the liner, the shoulder and the mouth are formed from different strips or parts. The materials of each strip or part may or may not vary.

In one embodiment, the strip or the part before shaping has the shape of a tube.

In one embodiment, the tube is formed of a flat strip which is shaped as a tube.

In one embodiment, the tube-shaped strip is closed by a weld achieved by welding means such as electron beam, laser or the like.

In one embodiment, one or a plurality of die(s) or part(s)/insert(s) forming a gauge is/are slid and nested within each other in the tube forming the liner of the case before shaping.

In one embodiment, the tube is shaped by mechanical and/or electromagnetic and/or pneumatic and/or hydraulic means.

In one embodiment, the shape of the die and the spacing with the following die are designed so as the thickness of the wall at level of the mouth of the case can be controlled.

In one embodiment, the dies or inserts may be composed of different elements, these elements may be of different materials and some elements may include radial or longitudinal clearances adapted to the welding modes.

In one embodiment, the material of the strip may be stainless steel, normal steel, brass, aluminum, an alloy or any other equivalent material, etc.

In one embodiment, the case liner is made by welding two half-shells, each being a shaped part.

In one embodiment, the half-shells preserve their stamping edges.

In one embodiment, the half-shells are cleared of the stamping edges immediately after welding.

In one embodiment, the half-shells are made from strips of various materials such as stainless steel, normal steel, brass, aluminum for example.

In one embodiment, the half-shells are welded together by one of the known welding means, such as electron beam, laser, etc.

In one embodiment, the stamping edges are eliminated by mechanical cutting, water jet cutting, deburring or any other known cutting means.

In one embodiment, the tube forming the body of the case is assembled to its cap then placed in an axial drawing machine equipped with a concentric gauge forming a die/insert and ensuring the inside diameter of the mouth and with an actuated counter-form, for example, by a press to deform the tube and provide it with the characteristics of the final case.

In one embodiment, the tube forming the body of the case is placed on a punch with appropriate shapes equipped with a concentric gauge forming a die/insert and ensuring the inside diameter of the mouth and by drawing the tube by means of an actuated counter-form, for example, by a press to deform the tube and provide it with the characteristics of the final case.

In one embodiment, the shaping operation comprises the taper and/or the shoulder and/or the tubular mouth.

In one embodiment, the invention relates to a case, for example an ammunition case for a firearm, obtained by a method as described in the present application.

DETAILED DESCRIPTION OF THE PRESENT INVENTION

Embodiments of the present invention are now described with reference to the figures wherein FIG. 1 illustrates a perspective view of the principle of the invention according to a first embodiment.

FIG. 1b illustrates known means for the implementation according to the first embodiment of the invention.

FIG. 2 illustrates a schematic perspective view of the principle of the invention according to a first embodiment.

FIG. 3 illustrates a schematic perspective view of the principle of the invention according to a first embodiment.

FIGS. 6 to 10 illustrate perspective views of various embodiments of the invention.

FIG. 13 illustrates a method according to an embodiment of the invention.

Figure 4:
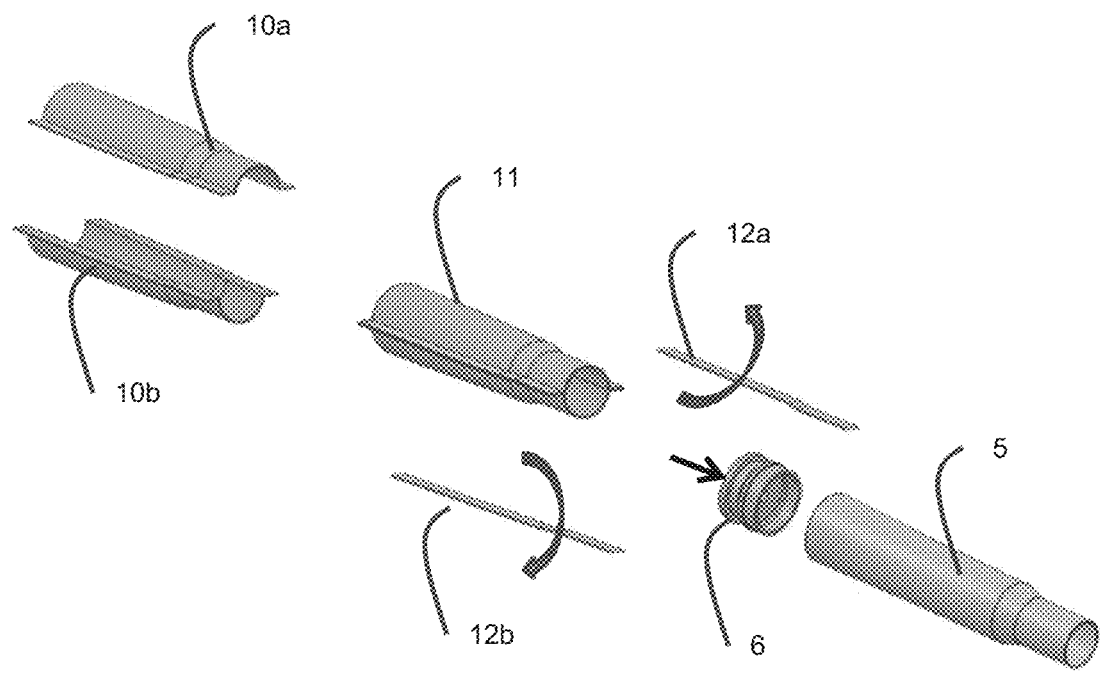
FIG. 4 illustrates a perspective view of the principle of the invention according to a second embodiment.

In a first embodiment, the present invention consists particularly in, first, manufacturing the main portion of the case, called body but which will also be called "liner", by shaping a thin tube 2 on rigid shapes 1a representing the internal volume as well as the shoulder and the mouth of the case also called collar.

Then, after having extracted shaping elements or shapes (named indifferently "die" or "insert" in the present application) 1a, in assembling said liner shaped with a cap 6, designed for this purpose, by well known welding process or mechanical assembly process.

One of the features of the present invention consists in forming the liners, not one by one but in long chains of several dozens or even more than one hundred of parts/cases that are shaped and then individualized by a cut. The chains are treated as such as a unit and are then used as means for supplying stations responsible for separating the elements, extracting the inserts 1a, presenting the caps 6 and welding them to the liners 5, thereby avoiding the need to load the latter machines individually and simplifying the required equipment.

In a first possible embodiment illustrated in FIGS. 1, 2 and 3, the inserts 1c are slid by means of a special guide 3 of insertion into the tube 2 while the latter is subjected to a rolling operation which makes it move from a flat band (called "strip") to a nearly closed cylinder (as illustrated in FIG. 1a from the Larousse dictionary and shows how such a cylinder can be formed by means of rollers). The inserts 1c are designed so as to be nested together and to constitute a continuous chain. If necessary, the main portions of the inserts 1a may include a small notch reducing the impact on the electron beam welding operation, or on the laser welding operation or another equivalent process intended to close the tube. This notch is illustrated in the detail "D" of FIG. 1.

In such a case, the insert insertion device may be advantageously equipped with a guide enabling their proper alignment.

The operation described above can also be carried out by inserting the inserts 1c in a long thin tube already closed and welded. In this case, it is required to provide sufficient clearance between the inserts and the closed tube in order to avoid deploying significant insertion forces likely to damage said tube.

The tube 2 is initially closed by a known welding process, such as the electron beam welding, or the laser welding or another equivalent process. The closed tubes filled with inserts 1c are then introduced into a shaping machine that will force the wall of the tube 2 against the inserts 1c to produce the slight taper, the shoulder and the mouth characteristic of the ammunition cases 4. This shaping operation can be carried out by mechanical means or by electromagnetic means or even by hydraulic means to name but a few non-limiting examples. This operation is illustrated in FIG. 2 particularly by the arrows placed around the tube 2. Once all the elements of the tube are shaped, a separation operation can be carried out by cutting, by means for example of a circular saw illustrated by the detail E (in FIG. 3), the tube at the height of the base of each insert 1c. The flange 5b and the tapered washer 1b are thus eliminated and the element comprising the "liner" 5 and its insert 1a are transferred in a special facility that will eject the insert 1a and then assemble the case "liner" 5 with its cap 6 to then make them move in a station for welding the cap and the "liner" and finally in a cutting station to the length of the mouth for constituting a complete case 7. These operations are particularly illustrated in FIG. 3.

According to the embodiment of the cap 6, the latter may already include an ejection groove. Otherwise, the latter may be produced in a free-cutting station designed for this purpose, see FIGS. 11 and 12.

In this embodiment, the inserts 1c are composed of two concentric portions, one 1a materializing the inner shape of the "liner" and the other taper-shaped one 1b designed so that, during the shaping of the tube 2 by one of the mentioned processes, it is possible to control the variation of the thicknesses of the wall caused by deformation. The two-portion composition of the inserts 1c enables saving the main portion 1a when separating the shapes.

If the embodiments using welds are applicable to all kinds of materials, the electromagnetic shaping is however limited to conductive metals and does not apply to all stainless steels. Limitations are also to be noted in the case of pairs likely to cause electrolyses or other undesirable phenomena. According to the circumstances and to the materials used, it is therefore possible to choose the appropriate process.

In another approach to the manufacture of multi-component cases according to a second embodiment (illustrated in FIGS. 4 and 5), it is also possible to proceed by drawing half-shells 10a and 10b of FIG. 4 presenting the taper, the shoulder and the mouth characteristic of the ammunition cases also starting with a sheet or flat band, for example of metal. Such drawing is easy to achieve with common means adapted to the desired shape. In this mode, we start with a flat sheet rather than with a sheet shaped as a tube, as in the first embodiment but according to a similar process, the sheet is brought to its final shape (tube for the first embodiment, half-shell for the other embodiments), for example by drawing for example between a punch and a die having the desired shapes.

The half-shells 10a and 10b can then be assembled using well-known welding means as for example electron beam, laser, etc.

In another possible embodiment (FIG. 4), the half-shells 10a and 10b can be separated from the stamping edges 12a and 12b and presented edge-to-edge, for welding, by a suitable mechanical device. The "liners" 11 produced thereby can then be housed in a storage device enabling to easily supply the following workstations.

Figure 5:
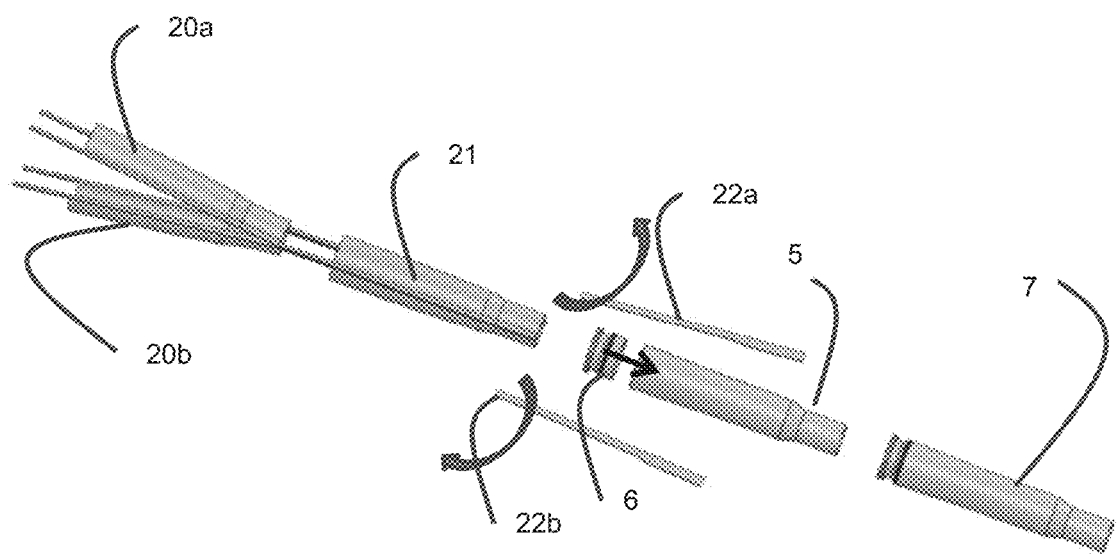
FIG. 5 illustrates a perspective view of the principle of the invention according to a second embodiment.

In another possible embodiment (FIG. 5), the stamping edges 22a and 22b of the half-shells 20a, 20b of FIG. 5 can be maintained and serve as a link between the welded portions. The sequencing achieved thereby may be conducive to the winding of the parts on well adapted drums offering both an intermediate storage possibility and a means for supplying the following workstations. The stamping edges 22a and 22b can be detached from the half-shells 20a, 20b during the operation of assembling the liner 5 with the cap 6 in order to form the case 7. This method also applies to the embodiment of FIG. 4.

In these embodiments, it is also possible to use shapes 1a as in the first mode to ensure good alignment of the two half-shells 10a and 10b (20a, 20b) when fixed to each other.

In another embodiment, schematically shown in FIGS. 6 to 10, is also conceivable to produce the case 7 by assembling two or more than two individual elements, each having been formed (or shaped) beforehand so that the final step of the process is only one assembly of prepared and formed portions: a machined cap 6, a tapered tube 5, a shoulder Sc, a cartridge mouthpiece 5d represented in FIG. 9a, or a shoulder with cartridge mouthpiece 5e, to mention only the main combinations enabled by the well known welding processes or mechanical processes.

In another embodiment which is schematically represented in FIG. 9b, the shoulder 5c may be advantageously provided with centering elements 5f enabling to easily align the tapered body 5c and the liner 5a in order to facilitate their assembly. It may be the same for the mouthpiece 5d in order to facilitate its shoulder 5c assembly.

Among the assembly means that can be taken into account are mentioned, not exclusively: electron beam welding, plasma welding, friction welding, brazing and crimping, etc. and other equivalent processes enabling the assembly of parts having various shapes and various materials.

Preferably, in the described embodiments, the cylindrical case body 5 is formed from a metal strip 2 which is rolled to form a tubular shape, the two edges of the adjacent strip being then fixed together, for example by welding. Other variants are possible according to what is described and illustrated in the present application. The materials used for the different portions are, preferably but not exclusively, metals.

In another embodiment, the tube 2 forming the body of the case 5 can be previously axially shaped to present one or all the characteristic(s) of the final case 7: taper, shoulder and mouthpiece intended to receive the projectile.

Figure 11:
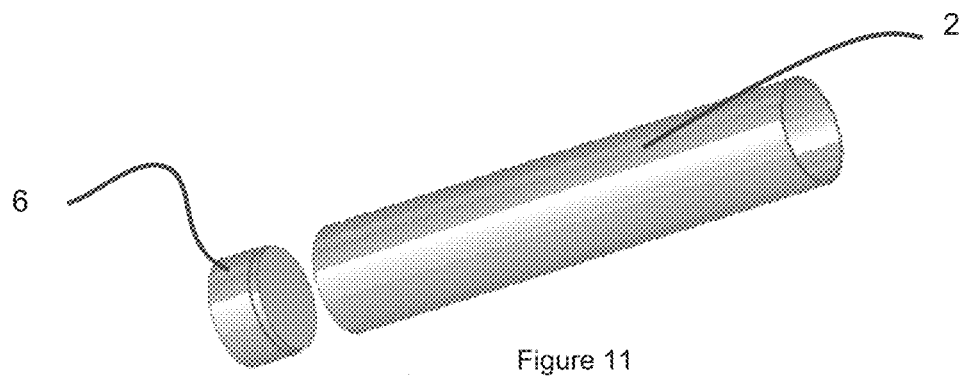
FIGS. 11 and 12 illustrate, in perspective, an embodiment of the invention.
Figure 12:
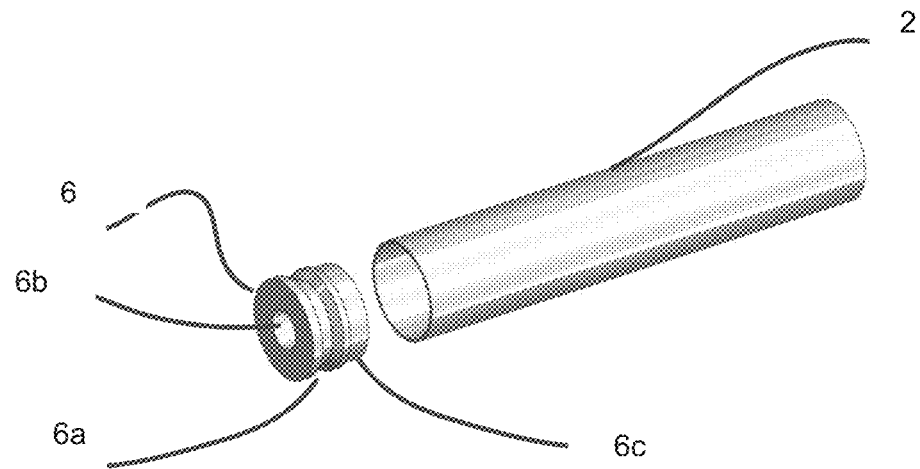

In this exemplary embodiment of the present invention, a first step, illustrated in FIG. 11, is carried out by assembling, by means of known welding processes or mechanical processes, a case body, formed of a thin-walled tube 2 and a cap 6 consisting of a cylindrical washer. Thus, a case blank which normally requires several hubbing and/or stretching, heat treatment and chemical treatment operations, is produced in one operation. This blank can then be axially shaped according to conventional processes of forming the taper, the shoulder and the mouthpiece of the cases as illustrated in the upper sequence of FIG. 13. The punch 26 makes it possible to ensure the inside diameter of the mouth while the counter-form 27 produces the taper, the shoulder and the mouth to give rise to a complete case. The drawing at the top of FIG. 13 illustrates the "traditional" axial forming steps. Thus, step 1 is the fixing of the tube 2 and cap 6, steps 2 and 3 are the insertion of the gauge 26 into the tube 2 assembled with the cap 6, step 3 is the lowering of the counter-form 27 to deform the tube 2 and provide it with the desired shaping (step 5) and step 6 is the withdrawal of the counter-form 27 and gauge 26.

In one embodiment using similar processes, for example, as illustrated by the successive steps of FIG. 13 (bottom drawing), the tube 2 forming the body of the case is inserted on a die with the appropriate shapes 25 representing the internal taper and shoulder of the case. A concentric gauge 26 forming an insert (as described above) ensuring the inside diameter of the mouth is inserted in the die 25 before drawing the tube 2 by means of a counter-form 27 actuated by a press to deform the tube 2 and provide it with the characteristics of the final case liner 5. An extractor, not shown in the drawing, allows extracting the shaped case liner 5 from the die 25. This shaping operation may comprise the taper 5a, the shoulder 5c and the tubular mouth 5d or be limited to the taper 5a and shoulder 5c or be limited to the only taper of the case 5a (see FIGS. 6 to 10). These operations can also be performed by other mechanical means acting, for example, radially as described above.

In one embodiment (illustrated in FIG. 12), the cylindrical washer 6 intended to form the cap of the case 2 may be equipped with an ejection groove 6a and with the housing 40 for receiving the primer 6b as well as a possible shoulder 6c facilitating the centering of the body 2 of the case. Such operations can be carried out for example by means of well known free-cutting, drawing or machining processes on the initial cylindrical washer and can be easily automated.

Of course, the method of FIG. 13 can be applied to the tube 2 to form the one-part case or to case portions which will be then assembled (see FIGS. 6 to 10 and the description above).

The embodiments of the invention are given by way of illustrative examples and should not be considered as limiting. They can be combined together or use equivalent means depending on the circumstances.

All the appropriate materials can be used for the initial sheet/band and portions of the case: stainless steel, normal steel, brass, aluminum, alloy(s) or another equivalent appropriate material suitable for the object to be achieved, etc.

The case can be of any size and for use in any type of weapon without limitation.

The invention claimed is:

1. A method for manufacturing bullet ammunition cases, each case comprising at least one main taper-shaped portion, a shoulder, a mouthpiece and a cap, wherein at least one of the main taper-shaped portion liner, the shoulder, and the mouthpiece are formed from at least one thin strip by shaping said at least one thin strip in the shape of a tube and forming said at least one of the main taper-shaped portion, the shoulder and the mouthpiece of the case on a die, wherein a plurality of dies is slid within and arranged one after the other in said tube before said forming.

2. The manufacturing method according to claim 1, wherein the main taper-shaped portion, the shoulder and the mouthpiece are formed from the same strip.

3. The manufacturing method according to claim 1, wherein the main taper-shaped portion, the shoulder and the mouthpiece are formed from different strips.

4. The manufacturing method according to claim 1, wherein said at least one thin strip is a flat strip before being shaped into said tube.

5. The manufacturing method according to claim 4, wherein the tube is closed by a weld achieved by welding means comprising at least one of electron beam or laser.

6. The manufacturing method according to claim 1, wherein the tube is shaped on the die by any one of a mechanical, an electromagnetic, a pneumatic, and a hydraulic operation.

7. The manufacturing method according to claim 1, wherein the shape of the dies and the spacing with the following die are designed in such a way that the thickness of the wall at the mouth of the case is controlled.

8. The manufacturing method according to claim 1, wherein the dies are composed of different elements, these elements may be of different materials and some elements may include radial or longitudinal clearances adapted to the welding modes.

9. The manufacturing method according to claim 1, wherein the material of said at least one thin strip is selected from any one or more of stainless steel, normal steel, brass, aluminum, or an alloy of any of the foregoing.

* * * * *